Patented Oct. 8, 1946

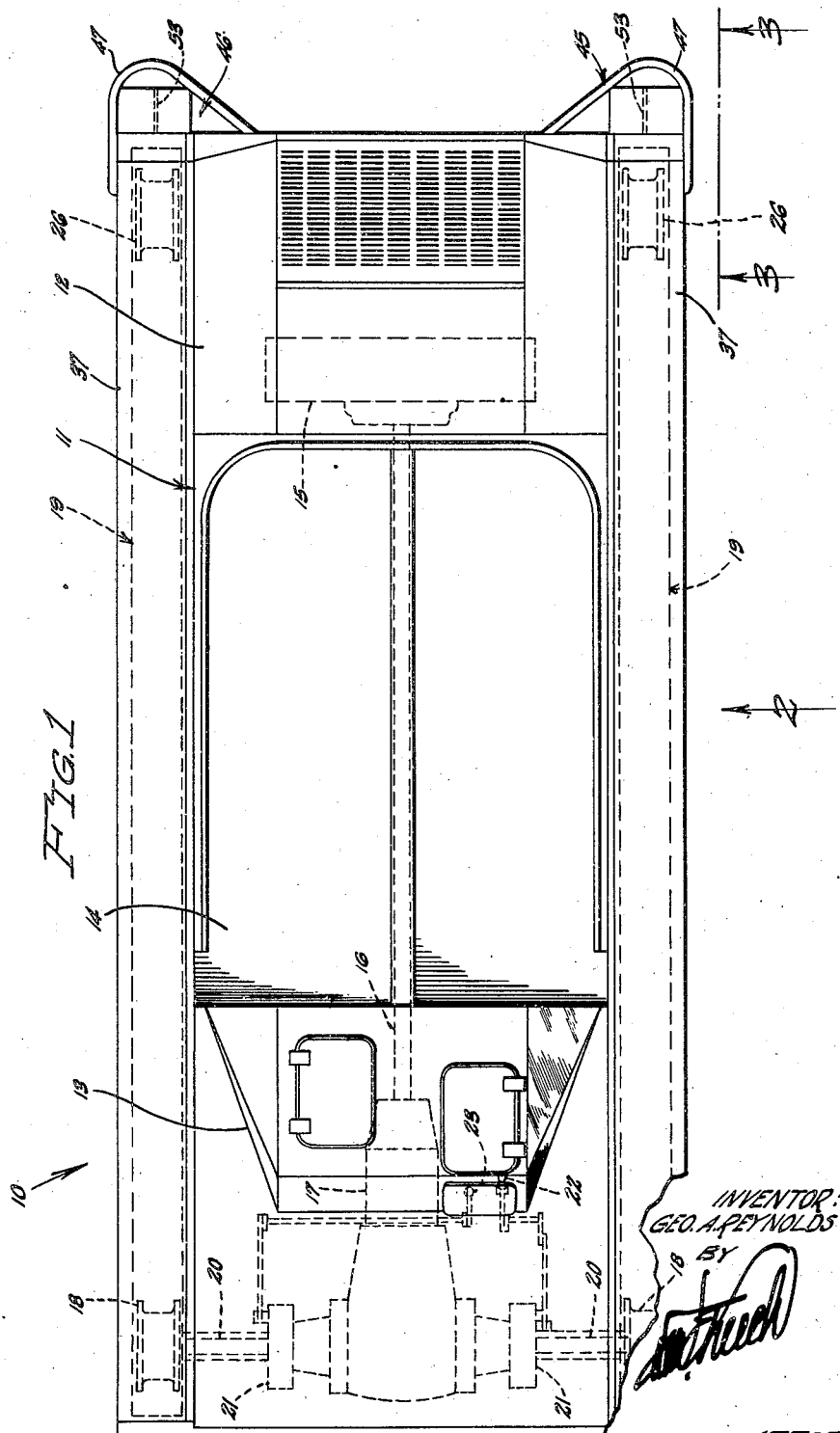

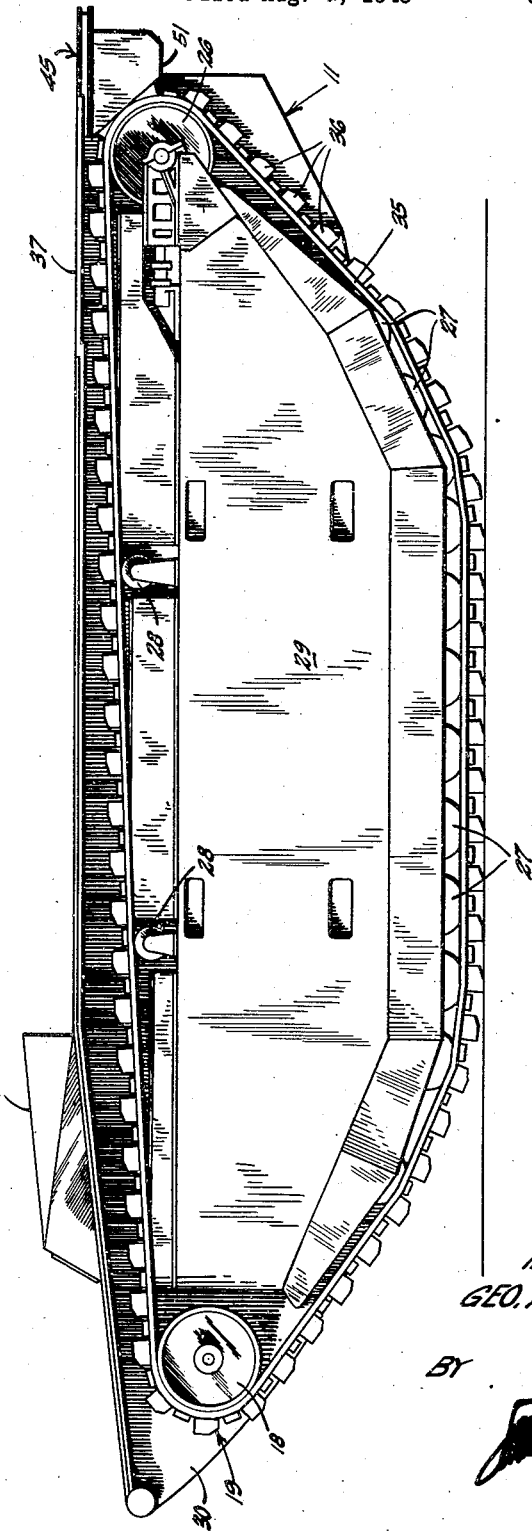

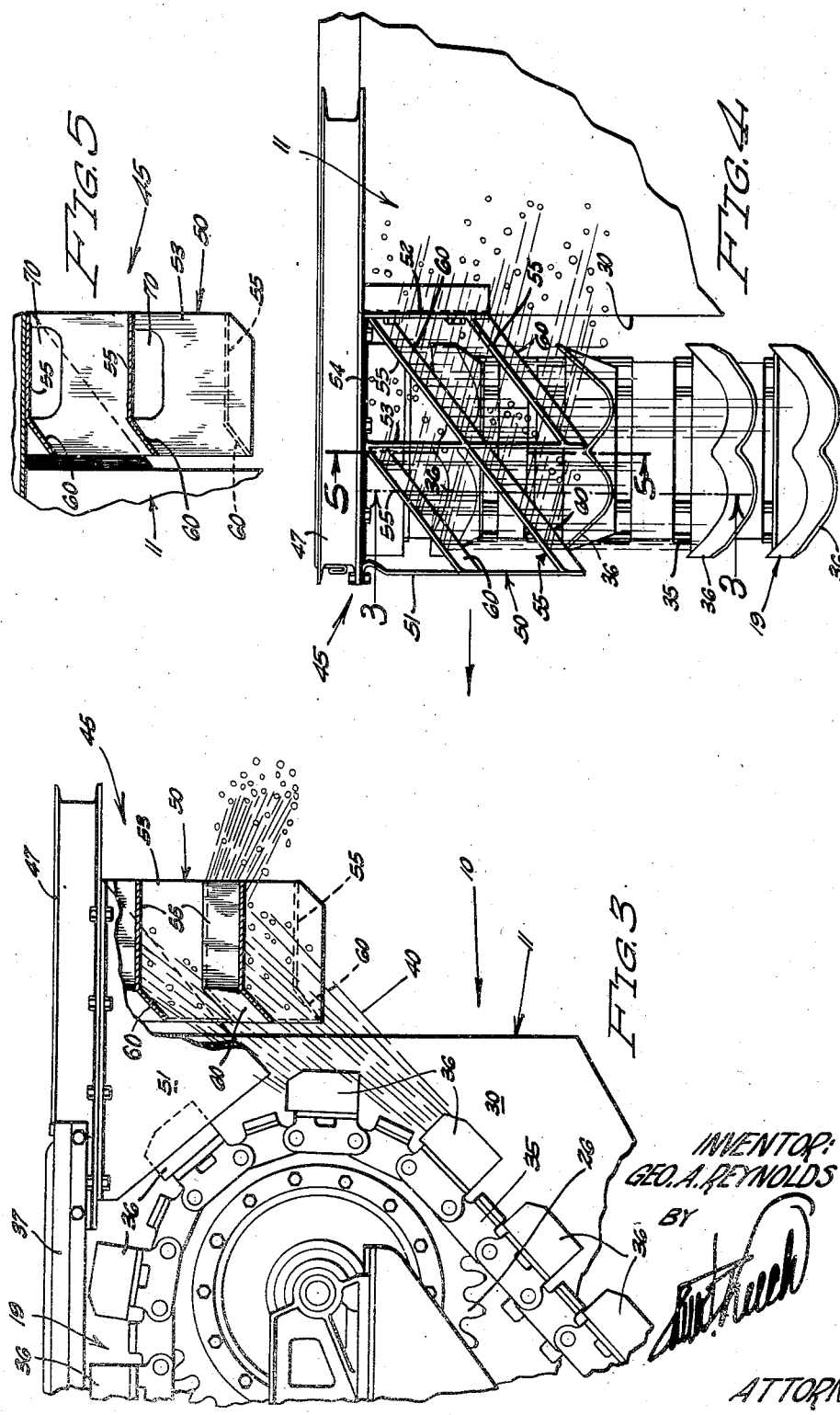

2,408,955

UNITED STATES PATENT OFFICE 2,408,955

AMPHIBIAN STEERING DEVICE

George A. Reynolds, Jr., Los Angeles, Calif., assignor to Food Machinery Corporation, San Jose, Calif., a corporation of Delaware Application August 7, 1943, Serial No. 497,725

8 Claims. (Cl. 115—1)

This invention relates to the art of steering amphibious land and water craft while in the water.

Such amphibians generally depend for propulsion in the water on the running gear with which the amphibian is supported and propelled while travelling on land. While useful with amphibians having various types of running gear, my invention is especially adapted for use on amphibians employing track-laying mechanism for support and propulsion.

It is an object of the invention to provide an improved steering device for use on amphibians.

In my co-pending application, Serial No. 462,484, in which I am a joint applicant with Dan R. Rankin, amphibian steering mechanism is disclosed which is especially suitable for use on amphibians equipped with track-laying mechanism. The essential feature of the steering mechanism there disclosed is fixing the steering blades in the paths of the streams of water propelled upwardly and rearwardly by the two track-laying mechanisms where they leave the water at the stern of the craft. The specific steering mechanism there disclosed while having great merit, nevertheless produced forces which retarded the forward movement of the amphibian equipped therewith and anything which cuts down the speed of the craft is, of course, highly undesirable.

It is an object of the present invention to provide an improved steering device for amphibians operating similarly to the steering mechanism aforesaid, but eliminating the drawback mentioned.

The present invention accomplishes the improvement aforesaid by disposing the steering blades of the device in planes which are substantially parallel with the fore and aft axis of the amphibian equipped therewith. It is desirable however, that these blades be reinforced without adding substantially to their weight or developing any reaction with the water discharged from the track-laying mechanisms which would retard the forward motion of the amphibian.

It is thus another object of my invention to provide an amphibian steering device reinforced as aforesaid.

Steering devices of the type to which my invention relates generally must occupy exposed positions at the rear end of the amphibian where these devices are likely to become damaged by hitting trees or other obstacles when the amphibian is backing.

It is yet another object of my invention to provide an amphibian steering device of this general type which is subject to minimum disadvantages due to the vulnerable location in which it is mounted.

The manner of accomplishing the foregoing objects, as well as further objects and advantages, will be made manifest in the following description taken in connection with the following drawings, in which:

Fig. 1 is a plan view of an amphibian in which is incorporated a preferred embodiment of my invention.

Fig. 2 is a side elevational view of Fig. 1.

Fig. 3 is a fragmentary enlarged detail view of a portion of Fig. 2, which includes the invention, with a portion of the latter broken away to show this in section taken on the line 3—3 of Fig. 4.

Fig. 4 is a rear elevational view of Fig. 3.

Fig. 5 is a sectional view of a modified form of the invention, the plane in which said view is taken being indicated by line 5—5 in Fig. 4. The modified structure shown in Fig. 5 has openings which are not found in the structure of the preferred form of the invention illustrated in Fig. 4, but is otherwise identical thereto.

Referring specifically to the drawings, these show an amphibian 10 including a hull 11 having an engine compartment 12 in the stern end thereof and a pilot's cabin 13 in the bow thereof, there being a well 14 disposed therebetween for accommodating cargo or passengers. Disposed in the compartment 12 is an engine 15, power from which is transmitted through a drive shaft 16 and transmission 17 to drive sprockets 18 of a pair of track-laying mechanisms 19 mounted on opposite sides of the hull 11.

The transmission 17 transmits power differentially to the sprockets 18 through independent shafts 20 having brakes 21 which are separately controlled by levers 22 and 23 so that pulling on the left hand lever 22 retards the operation of the left hand track laying mechanism 19 and speeds up the right hand track laying mechanism 19. Relaxing the lever 22 and pulling on the right hand lever 23 has exactly the opposite effect.

Each of the track-laying mechanisms 19 has an idle sprocket 26, a series of spring mounted bogie wheels 27 and idler rollers 28 all of which are mounted upon one of two pontoons 29 extending laterally from the hull sides 30. Trained about sprockets 18 and 26, the bogie wheels 27, and the rollers 28 of each mechanism 19 is an endless flexible track 35 having a series of grouser blades 36 thereon which contact the ground to support and propel the amphibian when the latter is travelling on land but which are also suitably shaped to engage the water and provide propulsion for the amphibian when it is afloat.

Provided to extend outward from the upper edge of each side of the hull 11 to overlie the adjacent mechanism 19 is a track guard 37.

As each track 35 travels along its endless path (see Fig. 2) the grouser blades 36, in leaving the water, throw a substantial stream of water 40 upwardly and rearwardly as shown in Fig. 3.

Mounted on the two rear corners of the hull 11 is a pair of deflector devices 45 and 46 which are reverse duplicates of each other so that a description of device 45 will suffice for both. This device includes a heavy V-shaped channel iron guard rail 47 one arm of which is united with the adjacent track guard 37 while the other arm is rigidly fixed to the stern end of the hull with the apex of the V extending rearwardly some distance behind the hull. The device 45 also includes a kite-like structure 50 made up of outer and inner vertical plates 51 and 52 and an intermediate vertical plate 53, these plates being secured at their upper edges to a base plate 54 mounted on the guard rail 47 and the track guard 37.

The vertical plates 51, 52 and 53 are connected by deflector plates 55 which slope outwardly and downwardly at about 40° to the horizontal. These plates are disposed in the stream of water 40 discharged from the adjacent track 35 and obliquely intercept this stream so as to turn this stream inwardly and set up a reacting turning moment directed outwardly and tending to turn the amphibian 10 to the right. The deflector plates 55, though inclined to the horizontal, are disposed parallel with the fore and aft axis of the amphibian 10 so that the impinging of the stream of water 40 thereagainst sets up no moment which would tend to retard the forward motion of the amphibian.

Front edges of the plates 55 connect with and may be formed from the same sheet of metal as reinforcing flanges 60, the latter being inclined downwardly relative to the plates 55, the angle of inclination not being sufficient to position the flanges 60 where any negative or retarding moment is set up by reaction between the stream of water 40 and these flanges. Preferably these flanges are in a neutral position, that is, parallel with the direction of movement of the streams of water 40. It would be quite possible, however, for these flanges to be bent from the sheet of metal forming the plates 55 at angles which would cause some forward moment to be produced by the reaction between the flanges 60 and the stream of water 40 and this result would, of course, not be undesirable.

Operation

When the amphibian 10 is afloat and both track-laying mechanisms 19 are operating at the same speeds, the streams of water 40 engage the oblique deflector plates 55 of the right and left deflecting devices 45 and 46 so that these streams of water are deflected inwardly towards each other thereby producing equal and opposite outward turning moments.

Should it be desired to turn the amphibian 10 in the water, the operator seizes one of the levers 22 or 23, depending upon whether he wishes to turn to the left or to the right, and pulls this towards him to set the brake 21 controlled by this lever and thereby slow up the operation of the track-laying mechanism on that side of the amphibian and increase the speed with which the opposite track-laying mechanism functions. This results in a lessening of the stream of water 40 produced by the retarded track-laying mechanism and an increase in the volume and speed of the stream of water 40 produced by the accelerated track-laying mechanism.

Assuming that the operator had pulled on the left control lever 22 as shown in dotted lines in Fig. 1, this would have retarded the left track-laying mechanism 19 and accelerated the right track-laying mechanism thereby decreasing the stream 40 produced by the first and increasing that produced by the second. As a result, the leftward moment created by reaction of the left hand stream 40 with the deflecting device 45 is much less than the rightward moment produced by the corresponding reaction of the right hand stream 40 with the deflecting device 46. The latter right hand turning moment is thus unbalanced, and swings the rear end of the amphibian to the right causing the ship to turn in the water to the left.

In a like manner pulling on the right control lever 23 and releasing the left lever will accelerate the speed of the left track-laying mechanism, retard the speed of the right track-laying mechanism and will turn the amphibian 10 to the right.

This operation of the invention to turn the amphibian 10 in response to the reaction of the fixed deflectors with streams of water discharged by the propulsion devices on opposite sides of the ship is accomplished without a retarding moment being set up by this reaction. This is due, of course, to the fact that the deflector plates 55 are parallel with the fore and aft axis of the ship.

The kite-like structure 50 of the deflector devices is protected by the guard rails 47 when the amphibian is backing so that only when backing against a heavy object which is low enough to get under the rails 47 but which is higher than the bottom of the structure 50 will this structure be engaged and possibly damaged. The kite-like structure 50 also is made of relatively light sheet metal so that in exceptional cases where conditions occur which will cause damage to this structure it can be readily bent back into shape if the damage is not too serious or it can be readily replaced by a spare structure carried with the amphibian.

While the vertical plates 52 and 53 are shown as continuous to simplify the design of the structure 50 it might be advantageous to form openings 70 in the plates 52 and 53 just beneath the lines where these plates join with deflector plates 55 as shown in Fig. 5 so that water travelling upwardly along or deflected upwardly from the lower surfaces of the deflecting plates 55 might pass through these openings in the plates 52 and 53 instead of striking against these vertical plates and being trapped. The provision of these openings in these vertical plates 52 and 53 prevents water of the stream 40 being caught in the inverted V-shaped traps between the vertical plates 52 and 53 and the upper two of the deflector plates 55.

I claim:

1. In a dirigible water craft the combination of: a hull; right and left propulsion means provided on opposite sides of said hull, each of said means in its operation discharging a stream of water non-parallel with the fore and aft axis of said craft; means for controlling the operation of said right and left propulsion means to drive these at the same or different speeds; and deflector means disposed in the paths of said streams at angles to oppositely intercept and deflect said streams from their course said deflector means being disposed substantially parallel with said axis whereby the driving of one of said propulsion means at a higher speed than the other causes an unbalanced turning moment to be produced by the reaction of the deflector means to the stream produced by the faster moving propulsion means without thereby producing a substantial moment tending to retard the forward motion of the craft.

2. In a dirigible water craft the combination of: a hull; right and left propulsion means provided on opposite sides of said hull, each of said means in its operation discharging a stream of water non-parallel with the fore and aft axis of said craft; means for controlling the operation of said right and left propulsion means to drive these at the same or different speeds; and deflector means fixed in the paths of said streams at angles to oppositely intercept and deflect said streams from their course said deflector means being disposed substantially parallel with said axis whereby the driving of one of said propulsion means at a higher speed than the other causes an unbalanced turning moment to be produced by the reaction of the deflector means to the stream produced by the faster moving propulsion means without thereby producing a substantial moment tending to retard the forward motion of the craft.

3. In a dirigible water craft the combination of: a hull; right and left propulsion means provided on opposite sides of said hull, each of said means in its operation discharging a stream of water non-parallel with the fore and aft axis of said craft; means for controlling the operation of said right and left propulsion means to drive these at the same or different speeds; and deflector means disposed in the paths of said streams at angles to intercept and deflect said streams inwardly from their course said deflector means being disposed substantially parallel with said axis whereby the driving of one of said propulsion means at a higher speed than the other causes an unbalanced turning moment to be produced by the reaction of the deflector means to the stream produced by the faster moving propulsion means without thereby producing a substantial moment tending to retard the forward motion of the craft.

4. In a dirigible water craft the combination of: a hull; right and left propulsion means provided on opposite sides of said hull, each of said means in its operation discharging a stream of water non-parallel with the fore and aft axis of said craft; means for controlling the operation of said right and left propulsion means to drive these at the same or different speeds; deflector means disposed in the paths of said streams at angles to oppositely intercept and deflect said streams from their course said deflector means being disposed substantially parallel with said axis whereby the driving of one of said propulsion means at a higher speed than the other causes an unbalanced turning moment to be produced by the reaction of the deflector means to the stream produced by the faster moving propulsion means without thereby producing a substantial moment tending to retard the forward motion of the craft; and reinforcing means for said deflector means which is embodied with an edge thereof and disposed substantially parallel with said streams.

5. In a dirigible water craft the combination of: propulsion means provided on opposite sides of said craft, said means in their operation discharging streams of water rearwardly and non-horizontally through the air above the surface of the water sustaining said craft; deflectors mounted on said craft and disposed parallel with the fore and aft axis of said craft in said streams of water so as to intercept and deflect the same oppositely; and means for selectively controlling the operation of said propulsion means to effect a steering of said craft by said deflector.

6. In an amphibian craft the combination of: a hull; right and left track-laying belts on opposite sides of said hull; an endless series of blades on said belts for engaging the water when said craft is afloat; power means for driving said belts to propel said craft through the water, said blades on said belts discharging streams of water rearwardly and upwardly in effecting said propulsion; deflectors fixed on said hull in parallelism with the fore and aft axis of said craft and disposed in the paths of said streams so as to deflect the latter inwardly; and means for controlling the driving of said belts to drive these at the same or different speeds.

7. In an amphibian craft the combination of: a hull; right and left track-laying belts on opposite sides of said hull; an endless series of blades on said belts for engaging the water when said craft is afloat; power means for driving said belts to propel said craft through the water, said blades on said belts discharging streams of water rearwardly and upwardly in effecting said propulsion; deflectors fixed on said hull in parallelism with the fore and aft axis of said craft and disposed in the paths of said streams so as to deflect the latter inwardly; means for controlling the driving of said belts to drive these at the same or different speeds; and reinforcing vanes bent from leading edges of said deflectors and disposed substantially parallel with said streams so as to produce no reaction from engagement with said streams tending to retard the forward motion of the craft.

8. A combination as in claim 1 in which said deflector means is made of relatively light sheet metal; and a protecting guard provided on said hull and extending rearwardly a greater distance than said deflector means to guard the latter against damage when said craft is backing.

GEORGE A. REYNOLDS, Jr.